United States Patent Office 3,661,971
Patented May 9, 1972

3,661,971
N-CHLORO DERIVATIVES OF DIIMINO-SUCCINONITRILE
Donald Ray Hartter, Wilmington, Del., assignor to E. I. du Pont de Nemours and Company, Wilmington, Del.
No Drawing. Filed Aug. 31, 1970, Ser. No. 68,496
Int. Cl. C07c 121/20, 121/40
U.S. Cl. 260—465.5        7 Claims

ABSTRACT OF THE DISCLOSURE

N,N'-dichlorodiiminosuccinonitrile and N-chloro-diiminosuccinonitrile can be made by the action of chlorine on diiminosuccinonitrile or by the action of chlorine on diaminomaleonitrile. The chlorinated diiminosuccinonitriles are useful as herbicides, and provide control for lawn weeds such as crabgrass. Johnson grass and beggarticks were similarly controlled.

FIELD OF THE INVENTION

This invention relates to novel chlorodiiminosuccinonitriles and to methods of making the same.

THE PRIOR ART

In Webster S.N. 707,459, filed Feb. 23, 1968 (now U.S. Pat. 3,564,039, patented Feb. 16, 1971) as a continuation-in-part of S.N. 670,763, filed Sept. 26, 1967 and now abandoned, which is assigned to the assignee of the present invention, there is disclosed the preparation of diiminosuccinonitrile by reaction of hydrogen cyanide and cyanogen in the presence of a basic catalyst such as potassium cyanide at a temperature of $-80°$ to $10°$ C.

The reaction of dicyanoethylene with $N_2F_4$ in the presence of sodium fluoride or the reaction of dicyanoacetylene with $N_2F_4$ has been shown by Sausen, U.S. Pat. 3,337,605 to give difluoroiminosuccinonitrile.

SUMMARY OF THE INVENTION

There have now been discovered the N-chlorodiiminosuccinonitriles of the formula $$\begin{array}{c} NC-C=NCl \\ | \\ NC-C=NQ \end{array}$$

where Q is H or Cl and a process for preparing them by chlorination of diiminosuccinonitrile. The chlorination can be made to take place stepwise, so that the two compounds may be obtained separately. The reaction is also in part reversible in that the dichloro compound can be treated with additional diiminosuccinonitrile to obtain the monochloro compound. There is also an alternative process for preparing the dichloro compound by chlorination of diaminomaleonitrile. These process aspects are summarized in the following equations:

$$\begin{array}{c} NC-C=NH \\ | \\ NC-C=NH \end{array} \xrightarrow{2Cl_2} \begin{array}{c} NC-C=NCl \\ | \\ NC-C=NCl \end{array} \xleftarrow{3Cl_2} \begin{array}{c} NC-C-NH_2 \\ \| \\ NC-C-NH_2 \end{array}$$

$$\downarrow Cl_2 \quad Cl_2 \nearrow \begin{array}{c} NC-C=NH \\ | \\ NC-C=NH \end{array}$$

$$\begin{array}{c} NC-C=NCl \\ | \\ NC-C=NH \end{array} \quad \Delta$$

N-chlorodiiminosuccinonitrile and N,N'-dichlorodiiminosuccinonitrile are colorless crystalline solids which find utility as herbicides.

DETAILED DESCRIPTION OF THE INVENTION

The process of this invention involves contacting and reacting chlorine with diiminosuccinonitrile. If the reaction is stopped when any amount up to one molecular equivalent of chlorine has reacted, N-chlorodiiminosuccinonitrile is obtained. If the reaction is stopped when between one and two molecular equivalents of chlorine have reacted, a mixture of N-chlorodiiminosuccinonitrile and N,N'-dichlorodiiminosuccinonitrile is obtained. If the reaction proceeds until two molecular equivalents of chlorine have reacted, N,N'-dichlorodiiminosuccinonitrile is obtained. This process may be carried out neat. In order to provide for dissipation of the heat of reaction, it is preferred to carry out the process in the presence of a liquid organic reaction medium which is inert to the reactants and products at the temperature of reaction. Suitable reaction media include nitriles such as acetonitrile and propionitrile, ethers such as dimethyl ether, diethyl ether, dibutyl ether, tetrahydrofuran, dioxane, anisole, ethylene glycol dimethyl ether, and diethylene glycol dimethyl ether, aromatic hydrocarbons such as benzene, toluene and xylene, chlorinated aliphatic hydrocarbons such as dichloromethane, chloroform and carbon tetrachloride and chlorinated aromatic hydrocarbons such as chlorobenzene, o-dichlorobenzene, and the like.

Chlorine may be introduced into the reaction as a liquid, as a gas, or as a solution in one of the liquid organic reaction media noted above.

The reaction may be carried out in the temperature range from $-100°$ C. to $+10°$ C. It is preferred to operate in the range from $-40$ to $-10°$ C. Above $-10°$ C. only the chlorinated solvents noted above are suitable since at these temperatures the others undergo sufficient chlorination to interfere with the process of the invention.

Pressure is not a critical variable in the reaction and pressures above and below atmospheric pressure may be employed. Atmospheric pressure is preferred for convenience. Either batch or continuous procedures may be employed.

The products are recovered from the reaction mixture by known means such as by crystallization, solvent evaporation, chromatography, and the like. If purification is desired, it is readily accomplished by sublimation or by recrystallization from a suitable organic solvent such as chloroform.

The reaction of N,N'-dichlorodiiminosuccinonitrile with diiminosuccinonitrile to form N-chlorodiiminosuccinonitrile may be carried out neat by impact grinding or by agitating a mixed melt. It is preferably carried out at temperatures in the range from 50-150° C. and in the presence of one of the organic reaction media described above for the chlorination reaction.

An alternative method of preparing N,N'-dichlorodiiminosuccininitrile is by chlorination of diaminomaleonitrile. The starting material in this instance is a tetramer of hydrogen cyanide which can be prepared as described by Woodward U.S. 2,499,411. The reaction can be conducted as described for the chlorination of diiminosuccinonitrile except that three moles of chlorine per mole of the diaminomaleonitrile are required to form N,N'-dichlorodiiminosuccinonitrile.

SPECIFIC EMBODIMENTS OF THE INVENTION

The following examples are intended to illustrate specific embodiments of this invention. In these examples parts and percentages are by weight unless otherwise indicated.

EXAMPLE 1

N-chlorodiiminosuccinonitrile $$\begin{array}{c} NC \diagdown \diagup NH \\ \diagup \diagdown \\ NC \diagup \diagdown NH \end{array} + Cl_2 \longrightarrow \begin{array}{c} NC \diagdown \diagup NCl \\ \diagup \diagdown \\ NC \diagup \diagdown NH \end{array}$$

Liquid chlorine (3 ml., 0.135 mole) was slowly added to a solution of 10.6 g. (0.10 mole) of diiminosuccinonitrile in 200 ml. of CH₃Cn at −40° C. After stirring at −40° C. for 0.5 hour, the solution was warmed to room temperature and evaporated to dryness. The resulting residue was slurried with diethyl ether and filtered, thus removing 2.5 g. of unreacted diiminosuccinonitrile. The filtrate was evaporated at reduced pressure leaving 8.1 g. of crude product from which was sublimed 5.9 g. (55% yield) of white N-chlorodiiminosuccinonitrile, M.P. 110–111° C.

EXAMPLE 2

N-chlorodiiminosuccinonitrile

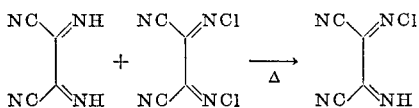

A solution of 5.30 g. (50 mmole) of diiminosuccinonitrile and 8.70 g. (50 mmole) of N,N'-dichlorodiiminosuccinonitrile in 200 ml. of CH₃CN was refluxed under nitrogen for 24 hours. The product was preabsorbed on silica gel and chromatographed. Elution with CCl₄ removed 0.30 g. of N,N'-dichlorodiiminosuccinonitrile. Then benzene:CHCl₃ (1:1) removed 3.50 g. of N-chlorodiiminosuccinonitrile, which was sublimed to obtain white crystals, 2.50 g. (35.7% yield), M.P. 120–122° C.

N-chlorodiiminosuccinonitrile, prepared as above, had the following characteristics:

Infrared spectrum:
 3280 cm.⁻¹ (NH); 2260 cm.⁻¹ (C≡N);
 1610 cm.⁻¹ (C=NH); 1560 cm.⁻¹ (C=NCl).
Molecular weight: cryoscopic in benzene, 142 (theory, 140).
*Analysis.*—Calcd. for C₄HN₄Cl (percent): C, 34.18; H, 0.72; N, 39.87; Cl, 25.23. Found (percent): C, 34.43, 34.33; H, 1.08, 1.01; N, 39.98; Cl, 25.46, 25.27.

EXAMPLE 3

N,N'-dichlorodiiminosuccinonitrile

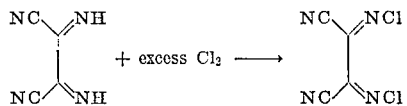

A solution of 16.75 g. (0.158 mole) of diiminosuccinonitrile in 250 ml. of CH₃CN under nitrogen was cooled to −40° C. and about 100 ml. of liquid Cl₂ was added. The solution was stirred at −20° C. for 2 hours and the excess Cl₂, HCl and solvent were removed to give 27.4 g. of light yellow crystals. Recrystallization from CHCl₃ gave 21.0 g. (76% yield) of N,N'-dichlorodiiminosuccinonitrile in the form of white crystals, M.P. 164.5–165.5° C.

EXAMPLE 4

N,N'-dichlorodiiminosuccinonitrile

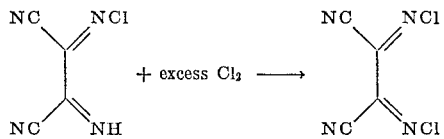

Liquid chlorine (20 ml.) was added to a solution of 282 mg. (2.0 mmole) of N-chlorodiiminosuccinonitrile in 20 ml. of CH₃CN at −40° C. After stirring at −20° C. for 1 hour, the excess Cl₂ and solvent were removed at reduced pressure leaving 350 mg. (100%yield) of light yellow crystalline N,N' - dichlorodiiminosuccinonitrile, M.P. 158–162° C.

EXAMPLE 5

N,N'-dichlorodiiminosuccinonitrile

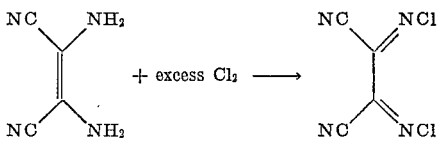

A solution of 1.08 g. (10 mmole) of diaminomaleonitrile in 20 ml. of CH₃CN was cooled to −20° C. and 10 ml. of liquid Cl₂ was added. After stirring at −20° C. for 2 hours, the excess Cl₂, HCl and solvent were removed to give a solid from which was sublimed 93 mg. (5.3% yield) of N,N'-dichlorodiiminosuccinonitrile, M.P. 164–165° C.

N,N'-dichlorodiiminosuccinonitrile, prepared by the procedure of Example 3, had the following characteristics:

Infrared spectrum: 2240 cm.⁻¹ (C≡N); 1540 cm.⁻¹ (C=NCl).
Ultraviolet absorption:

$\lambda_{max}^{CH_3CN}$ 258 mμ. (ε 18,200) sh. 300 mμ (ε 278)

Molecular weight: ebullioscopic in benzene, 175 (theory 174).
Mass spectroscopy: molecular ion, meas. m./e. 173.9502, calcd. for C₄N₄Cl₂, m./e. 173.9500.
*Analysis.*—Calcd. for C₄N₄Cl₂ (percent): C, 27.46; N, 32.02; Cl, 40.52. Found (percent): C, 27.19, 27.28; N, 31.94, 31.97; Cl, 40.47, 40.49.

The herbicidal activity of the compounds of this invention is shown in Examples 6 and 7.

EXAMPLE 6

N-chlorodiiminosuccinonitrile (50 kg.), formulated as a wettable powder, was suspended in 800 liters of water containing 0.5% of polyethylene sorbitan monolaurate. This suspension was kept agitated and sprayed over a hectare of fine lawns. The application was made early post-emergence to the weeds. Such weeds as crabgrass (Pigutaria spp.), seedling Johnson grass (Sorghum La lepense) and beggarticks (Bidens spp.) in the two-leaved stage were controlled.

EXAMPLE 7

The procedure of Example 6 was repeated using N,N'-dichlorodiiminosuccinonitrile in place of N-chlorodiiminosuccinonitrile. Crabgrass, Johnson grass and beggarticks were similarly controlled.

The foregoing detailed description has been given for clarity of understanding only and no unnecessary limitations are to be understood therefrom. The invention is not limited to the exact details shown and described for obvious modifications will be apparent to those skilled in the art.

The embodiments of the invention in which an exclusive property or privilege is claimed are defined as follows:
1. A compound having the formula

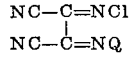

wherein Q is H or Cl.
2. The compound of claim 1 wherein Q is H, N-chlorodiiminosuccinonitrile.
3. The compound of claim 1 wherein Q is Cl, N,N'-dichlorodiiminosuccinonitrile.
4. The method of making the compound of claim 1 which compirses contacting and reacting diiminosuccinonitrile with chlorine at a temperature in the range of −100 to +10° C.

5. The method of claim 4 in which the reaction is conducted at −40° C. to −10° C.

6. The method of making the compound of claim 2 which comprises contacting and reacting N,N'-dichlorosuccinonitrile with diiminosuccinonitrile at a temperature of 50 to 150° C.

7. The method of making the compound of claim 3 which comprises contacting and reacting diaminomaleonitrile with chlorine at a temperature in the range of −100° to +10° C.

References Cited

UNITED STATES PATENTS

| | | | |
|---|---|---|---|
| 3,551,473 | 12/1970 | Hartter | 260—465.5 R |
| 3,564,039 | 2/1971 | Webster | 260—465.5 R |
| 3,337,605 | 8/1967 | Sausen | 260—465.5 R |

JOSEPH P. BRUST, Primary Examiner

U.S. Cl. X.R.

71—105